March 20, 1956 W. G. COENE 2,738,670
VISCOSIMETER

Filed March 27, 1953 3 Sheets-Sheet 1

WILLIAM G. COENE
INVENTOR.

BY
ATTORNEYS

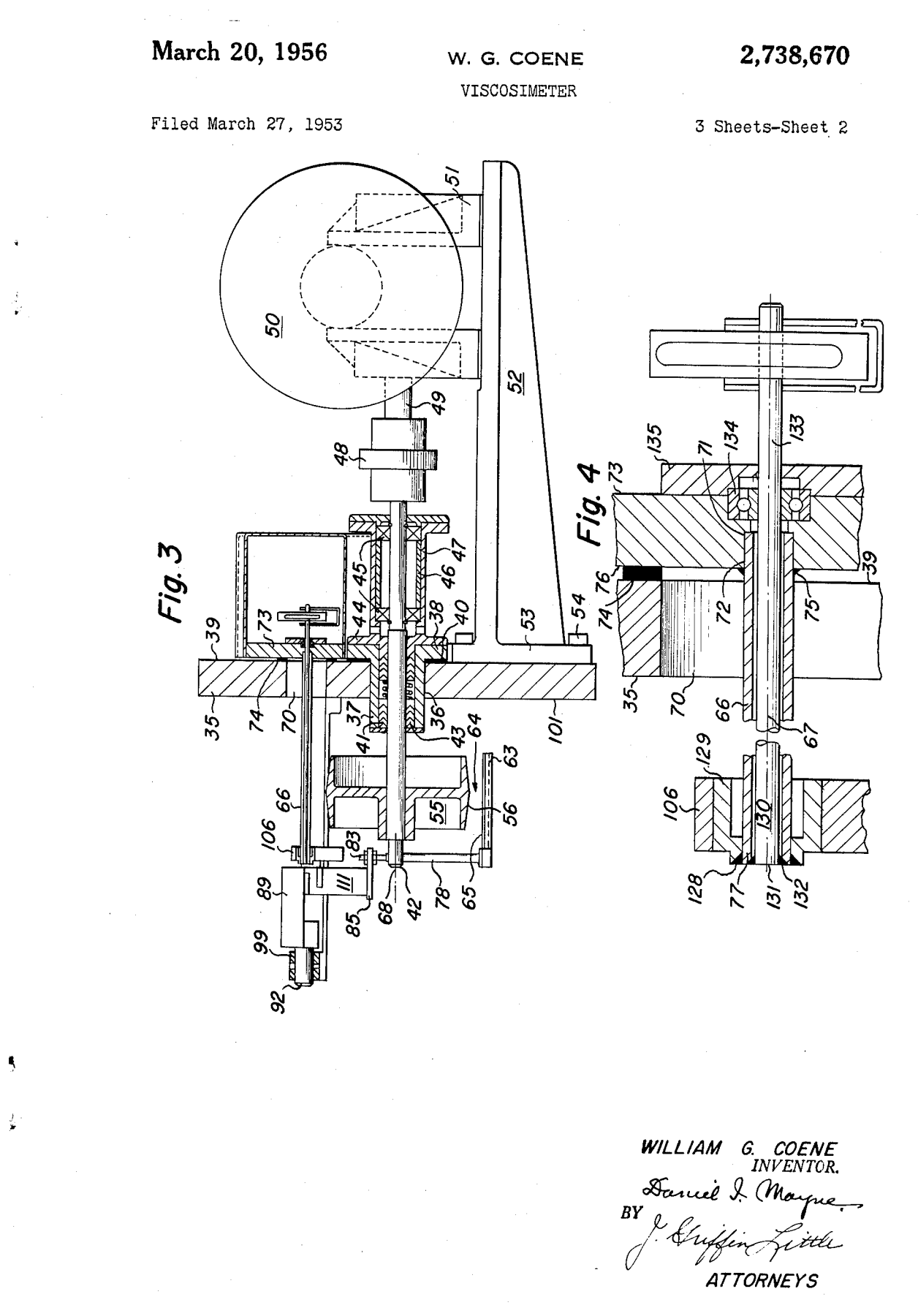

March 20, 1956     W. G. COENE     2,738,670
VISCOSIMETER

Filed March 27, 1953     3 Sheets-Sheet 2

WILLIAM G. COENE
INVENTOR.

BY

ATTORNEYS

March 20, 1956 W. G. COENE 2,738,670
VISCOSIMETER
Filed March 27, 1953 3 Sheets-Sheet 3

WILLIAM G. COENE
INVENTOR.

BY
ATTORNEYS

United States Patent Office 2,738,670
Patented Mar. 20, 1956

2,738,670

VISCOSIMETER

William G. Coene, Rochester, N. Y., assignor to Eastman Kodak Company, Rochester, N. Y., a corporation of New Jersey Application March 27, 1953, Serial No. 345,201

10 Claims. (Cl. 73—60)

The present invention relates to a continuous fluid measuring device, and more particularly to a viscosimeter for measuring continuously the viscosity of a liquid.

The device of the present invention is adaptable to most every vessel that contains a viscous substance requiring measurement, and more particularly the device is designed to measure and/or control the viscosity of Newtonian and non-Newtonian fluids very rapidly and accurately. The measuring mechanism of the present invention may be employed to transmit the viscosity measurement to precise, automatic equipment, which, in turn, may indicate, record or control the viscosity of the liquid by altering its composition or physical state.

The present invention has as its principal object, the provision of a device which will quickly and accurately measure the viscosity of a liquid.

A further object of the invention is the provision of a metering and measuring device of the class described, which will provide a continuous indication of the viscosity of the liquid being measured.

Yet another object of the invention is the provision of a device for measuring viscosity which is simple in structure, comprises few parts of rugged construction, easy to operate, and highly effective in its results.

To these and other ends the invention resides in certain improvements and combinations of parts, all as will be hereinafter more fully described, the novel features being pointed out in the claims at the end of the specification.

In the drawings:

Fig. 3 is a longitudinal sectional view through a modified form of liquid measuring device constructed in accordance with the present invention, showing the relation of the various parts;

Fig. 4 is a longitudinal sectional view through a portion of the structure illustrated in Fig. 3, but on a larger scale than the latter, showing the arrangement for anchoring one end of the torque tube, and for connecting the second shear member to the other end of the torque tube;

Similar reference numerals throughout the various views indicate the same parts.

In many processes in which liquid is involved, it is desirable, and in some cases absolutely essential, to maintain the viscosity of the liquid constant, or at least hold such viscosity within rather narrow predetermined limits. In order to maintain such viscosity control, various viscosity readings must be taken. One method is to remove samples of the liquid and then take these samples to a laboratory for analysis and tests. Obviously with this method a considerable time lag is involved before the viscosity readings are determined, with the result that a large quantity of liquid of undesired or incorrect viscosity might be passed through the processing operation before the material may be readjusted to give the proper viscosity desired, the disadvantages of which are deemed apparent to those skilled in the art.

In order to overcome this disadavntage, the present invention provides an arrangement by which viscosity is measured continuously, and such measurement is transmitted to precision automatic equipment which, in turn, may indicate, record or control the viscosity of the liquid so that its composition or physical state may be altered to maintain and insure the proper or predetermined viscosity condition.

Figure 5:
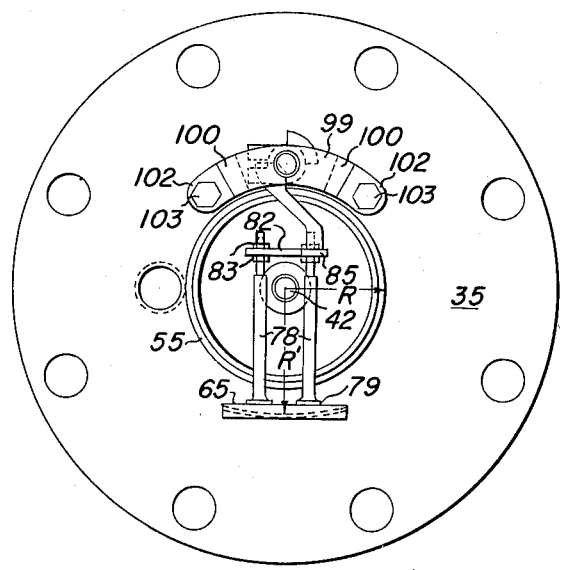
Fig. 5 is a left hand view of the structure illustrated in Fig. 3.

To secure this result, the viscosity measuring device is positioned within a vessel, pipe or container, and in direct contact with the liquid therein. As the viscosity measurements are made, these measurements are transmitted automatically and quickly to a point outside the vessel, pipe or container, for use by the operator. In the embodiment illustrated in Figs. 1 and 2, the viscosity measuring device is shown in connection with a vessel employed in a continuous processing apparatus in which the liquid being measured is passed continuously through a closed vessel. This is, however, by way of illustration only, as the measuring device of the present invention is adapted to almost any vessel, either open or closed, that contains a viscous substance or liquid which requires viscosity measurements. For example, the embodiment illustrated in Figs. 3 to 5 is a separate device suitable for use with a pipe or other container.

Figure 1:
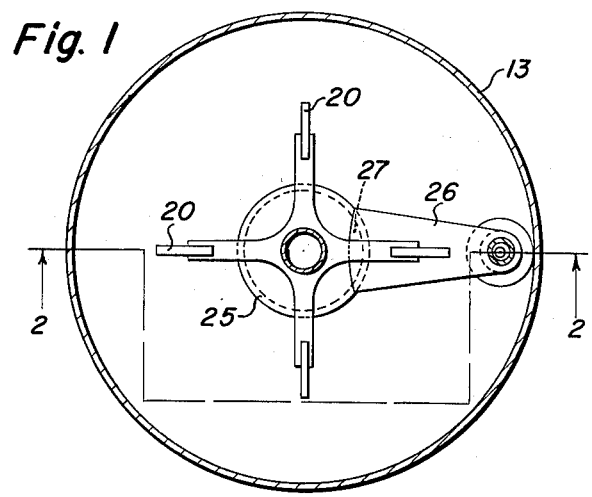
Fig. 1 is a transverse sectional view through a vessel containing the liquid, and illustrating the relation thereto of one embodiment of a viscosity or shear measuring apparatus of the present invention and taken substantially on line 1—1 of Fig. 2, and showing the relation of the shear plates and related parts.
Figure 2:
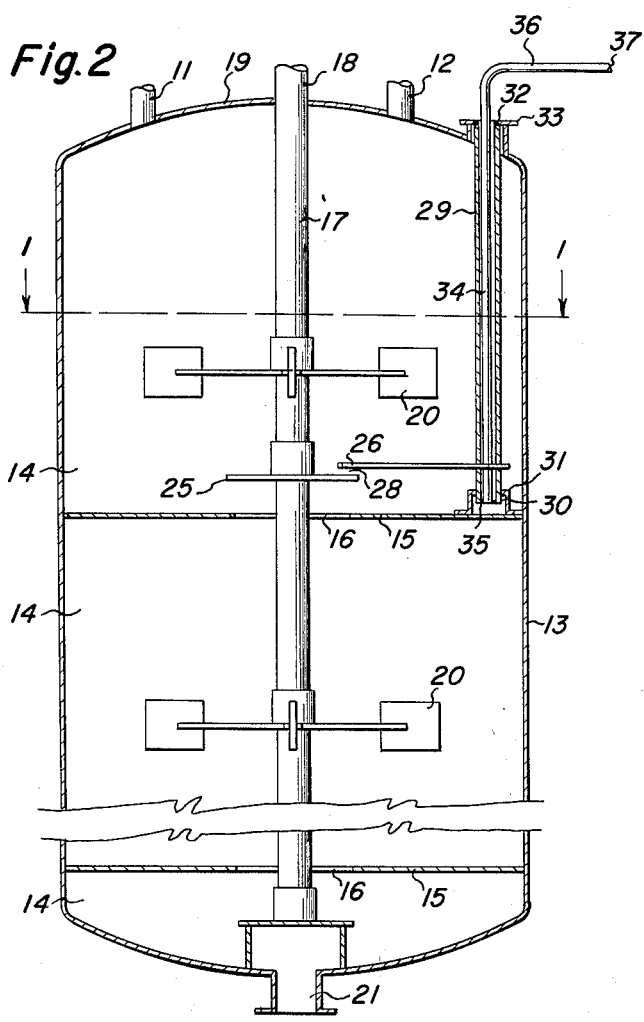
Fig. 2 is a longitudinal sectional view taken substantially on line 2—2 of Fig. 1 showing the viscosity measuring apparatus and liquid containing vessel.

The embodiment of the invention illustrated in Figs. 1 and 2 is employed in connection with a continuous processing arrangement in which the material or ingredients which are to form the final liquid are fed to a tank or vessel. In order to prevent by-passing or short circuiting of some of the ingredients, and to insure proper mixing of the ingredients to provide uniform liquid, the vessel is preferably divided longitudinally or vertically into various compartments by means of baffles. Each compartment is, in turn, provided with an agitator which stirs or agitates the ingredients to mix the latter. After the ingredients are properly mixed in one compartment, they pass through an opening in the baffle to the next compartment. One of these compartments is provided with a viscosity measuring device constructed in accordance with the present invention.

The device of the present invention comprises, in general, a shear plate or member which is in contact with the liquid and is rotated at a constant speed. A non-rotatable shear plate or member is positioned to overlie a constant area of the rotating shear plate or member and is spaced therefrom by a thin layer of the liquid to be measured. The non-rotating plate or member is, in turn, connected to a torque element or tube. The result is that when the first plate or member is rotated, a turning force or torque, is transmitted through a thin layer of liquid to impart a turning force or drag on the non-rotatable plate or member. This force is then transmitted to the torsion element or torque tube to impart or induce a twist or torque therein. This twist is transmitted to a point outside the vessel or container to precision instruments, of standard construction, which serve to indicate, record or control the viscosity.

Figs. 1 and 2 of the drawings show a specific application of one embodiment of the measuring device of the present invention used in connection with a continuous or batch processing of a liquid in which the materials and solvents which form the liquid are fed through separate pipes 11 and 12 to the vessel or container 13, as best shown in Fig. 2. The interior of the vessel is preferably divided longitudinally or vertically into separate compartments 14 by means of annular shaped baffle members 15 each of which has a central opening 16. The exact number of such compartments will depend upon the particular materials to be handled, and forms no part of the present invention. The vessel 13 has mounted therein a shaft 17 which extends the length of the tank or vessel and through the aligned openings 16 of the baffles. The upper end 18 of the shaft projects through a top 19 of the vessel 13. The end 18 of the shaft may be connected to a motor or other prime mover, not shown, to rotate the shaft at a constant speed. As the motor or other prime mover may be of any suitable or well known design, and forms no part of the present invention, it is not illustrated or described.

The liquid, or liquid ingredients, in each compartment 14 is mixed by means of an agitator, broadly designated by the numeral 20, and connected to and rotatable as a unit with shaft 17. Here again, as the agitators may be of any suitable and well known design, and form no part of the present invention, details thereof are not illustrated or described. Suffice it to say, that the interior of the vessel is divided into compartments which are in liquid or fluid communication by means of openings 16 in the baffles 15, and each compartment may have rotatably mounted therein, an agitator 20 carried by the shaft 17, all as clearly illustrated in Fig. 2. The presence of the baffles serves to eliminate short circuiting of some of the ingredients in one of the compartments to the next compartment before the liquid is properly mixed. The completely mixed liquid passes out of the bottom of the vessel 13 through a suitable opening 21.

In addition to the agitators 20, one of the compartments, the top one in Fig. 2, has also positioned therein a viscosity measuring device constructed in accordance with one embodiment of the present invention. This device comprises, in this embodiment, a single flat or planar rotatable shear plate 25, which is suitably connected to and rotates as a unit with shaft 17 and projects radially therefrom. A second radially extending sector-shaped shear plate 26 is positioned axially slightly above and parallel to, and offset laterally relative to, the plate 25 so as to overlie a constant area 27 of plate 25 adjacent the periphery thereof, as best shown in Fig. 1. It will be apparent from an inspection of Fig. 2, that a thin layer 28 of the liquid will be interposed between plates 25 and 26. The result is that when shaft 17 and plate 25 are rotated, a turning force or torque is imparted to the thin layer 28, and this force will be transmitted to and will tend to turn or drag plate 26 along with plate 25. However, plate 26 is held against rotation or turning in a manner and for a purpose to be later described. The distance between the non-rotatable shear plate 26 and the rotating shear plate 25 depends upon (1) the speed of shaft 17; (2) the viscosity of the liquid being measured; (3) the amount of torque desired upon the non-rotatable shear plate 26; and (4) the area of the two plates.

The non-rotating shear plate 26 is affixed to a torsion element which is in the form of a hollow torque tube 29, and the latter is positioned at both ends as follows: the tube 29 is allowed to turn at one end 30, the lower end as viewed in Fig. 2, where it floats in a foot guide 31, which is carried by the adjacent baffle plate 15. The plate 26 is preferably attached rigidly at its apex end to the torque tube 29, just above the bearing 31, as shown in Fig. 2. The upper end 32 of the tube 29, on the other hand, extends into and is welded to a pipe flange 33 carried by the top 19 of the vessel 13. This fixed position at flange 33 is the location where a rod 34 is inserted into tube 29. The rod 34 extends the full length of the tube 29 and is welded at 35 to the lower free end 30 of the tube 29, thereby sealing the tube 29 from the liquid in the container or vessel into which tube 29 is immersed. Where the rod 34 is welded at 35 to tube 29 is the sole support for the rod 34, as is clearly illustrated in Fig. 2. On the other hand, where the upper end of the tube 29 is connected to flange 33 is the sole point of connection of the tube 29 to the vessel.

It will now be apparent that as the shear plate 25 is rotated, a turning force or torque is transmitted through the layer of liquid 28 to the non-rotatable shear plate 26. This torque on plate 26 is, in turn, transmitted to the torsion element or tube 29 to impart a torque or twisting force to the latter. The transmission of torque or twisting force changes with viscosity to alter or vary the twist of tube 29. It is at the point of welding 35 that the twist in tube 29 is transferred to rod 34 which extends upward loosely through and out of tube 29. When the twist of tube 29 is transferred to rod 34 at weld 35, the twist is transferred into a rotary or turning movement of the rod 34, as is deemed apparent. This turning movement of the rod 34 is, in turn, transmitted to suitable precision instruments, not shown, connected to the end 37 of the horizontal arm 36 of rod 34 to indicate the viscosity of the liquid in the vessel 30. There are numerous mechanical, electrical or pneumatic instruments on the market which are very accurate, and which when connected to the end 37 of arm 36 translate the turning of rod 37 into terms which indicate, record or control the vicosity of the liquid. As these instruments are purchased on the open market and form no part of the present invention, details are not deemed necessary to an adequate and full understanding of the viscosity measuring device of the present invention. Suffice it to say that the particular instrument attached to the end 37 depends upon the particular information desired, or the results to be obtained by the force applied to the instrument by the rotation of rod 34 caused by twist of tube 29.

Many modifications of the viscosity measuring device of the present invention will be apparent to those in the art. For example, the device may be used in pressure vessels, storage tanks, pipe lines, and, in fact, almost any vessel or container in which it is desirable to measure liquid viscosity. Also, the rotating shaft which supports the rotating shear plate or member may be a special part of the viscosimeter, per se, as illustrated in Figs. 3-5, and to be later more fully described.

Figs. 3-5 show a modified viscosity measuring device which constitutes a complete unit, and which may be secured removably to a vesel, pipe or other container in which the liquid to be measured is positioned. The entire device is supported on a circular pipe flange 35 which may be secured, in a well known manner, to a mating flange mounted on the pipe, vessel or suitable container. In the preferred embodiment, the flange 35 is a 6" pipe flange; but, obviously, other suitable size flanges may be employed without departing from the invention so long as the flange is big enough to support the various mechanisms and to permit the latter to be inserted in an opening in the container. The important fact is that all the parts of the device are supported by the flange 35 so that they may be moved as a unit therewith, the advantage of which is deemed apparent. The flange 35 is formed with a central opening 36 adapted to receive a T-shaped bushing having a tubular or sleeve portion 37 which extends through opening 36 in flange 35, and a radial flange 38 which overlies the outer or right face 39 of the flange 35, see Fig. 3. A suitable gasket 40 is positioned between flange 38 and face 39 to afford a liquid tight seal at this point. The sleeve portion 37 of the bushing has positioned therein a hollow packing gland 41 through which a drive shaft 42 extends. The gland 41 has positioned therein a suitable packing material which affords a liquid tight seal around shaft 42, as is deemed apparent. The gland 41 terminates in a radial flange 44 which overlies flange 38 of the T-shaped bushing, as clearly illustrated in Fig. 3. The shaft 42 is supported in a pair of bearings 45 which are spaced by a sleeve 46 which, with the bearings, is supported in a housing 47. The flanges 38 and 44 and the housing 47 are all secured to and supported by the main pipe flange 35 by any suitable means, such as bolts, not shown. As many other suitable means for supporting the flanges 38 and 44 and the housing 47 on the pipe flange 35 will readily suggest themselves to any mechanic or engineer, details of such means are not deemed necessary.

The drive shaft 42 is connected through a suitable flexible coupling 48 to a shaft 49 connected to and driven by an electric motor 50 of suitable design. The latter is supported on a bracket 51 which, in turn, is carried by a horizontal arm 52 of an L-shaped bracket, the vertical arm 53 of which is connected by bolts 54, or other suitable means, to flange 35. Thus, the motor and its associated parts, as well as the shaft 42, are carried and supported by the pipe flange 35.

The inner or left end of shaft 42, as viewed in Fig. 3, has positioned thereon a drum 55 having an axially extending periphery or surface 56 which may be considered broadly as arcuate or cylindrical. Also, surface 56 is substantially concentric with the axis 42, as is apparent from an inspection of Figs. 3–5, so that the axis of rotation of drum 55 is the axis of shaft 42. It will now be apparent that if drum 55 is positioned in a liquid on the shaft 42 and drum 55 are rotated, the liquid adjacent the drum surface will have a turning force imparted thereto. The drum surface 56 is preferably slightly crowned, as shown in Fig. 3, and for a purpose to be later more fully described.

An axially extending follower plate 63 is positioned to overlie and is spaced radially from surface 56 of drum 55, and has a width slightly greater than the width of drum 55, as best shown in Fig. 3. Now, when the device is placed in a liquid, the viscosity of which is to be determined, a thin liquid layer designated with the numeral 64 will be positioned between and will space drum 55 from the follower plate 63. The upper face 65 of the plate 63, that is the face toward the drum 55, is arcuate in shape and is curved in the same direction as the adjacent portion of the drum periphery 56, as clearly illustrated in Fig. 5, and for a purpose to be later described. Also, the face 65 has a length such as to extend over or to overlie only a portion of the periphery 56 of the drum 55, as best illustrated in Fig. 5. With this arrangement, it is apparent that when drum 55 is rotated, the liquid layer 64 will have imparted thereto a turning force which will be transmitted through the liquid layer 64 to the follower plate 63 and will tend to turn the latter with the drum 55. However, as in the structure illustrated in Figs. 1 and 2, it is preferred to restrain plate 63 against actual turning or rotation, so that the turning force transmitted to the plate 63 can be, in turn, transmitted to certain mechanism which may be utilized to indicate, record, and/or control the viscosity of the liquid.

To this end, the plate 63 is connected in a manner to be presently described, to a hollow torque tube or element 66, which may be identical in structure with the torque tube 29, above described, so that the plate 63 will tend to turn about the axis 67 of the tube 66, as is deemed apparent from an inspection of Figs. 3 and 4. As the plate 63 tends to move or turn about axis 67, the center of curvature of the arcuate surface 65 of plate 63 preferably is also on the axis 67. With this construction, small rotational displacement of plate 63 results only in very slight changes in spacing between the drum 55 and the follower 63. However, if the center of curvature of the surface 65 were on the axis 68 of shaft 42 or drum 55, then similarly, rotation displacement of the follower plate 63 would result in relatively great changes in the spacing between the drum 55 and the plate surface 65. Thus, the following plate 63 tends to turn about axis 67, which is also the center of curvature of the surface 65. Therefore, the drum periphery 56 and the arcuate surface 65 are curved in the same direction, but have unequal radii of curvature, as shown at R and R' respectively, Fig. 5.

The flange 35 is also formed with an axially extending opening 70 spaced radially from opening 36 and through which the torque tube 66 extends in radially spaced, substantially parallel relation to shaft 42, all as clearly shown in Figs. 3 and 4. The right end 71 of tube 66 extends into a registering opening 72 in the plate 73, which is secured to pipe flange 35 by means of bolts or other suitable fashioning means, not shown. A gasket 74 surrounds opening 70 and is positioned between plate 73 and the face 39 of flanges 35, as shown in Figs. 3 and 4, to produce a liquid tight joint between flange 35 and plate 73. The tube 66 is welded at 75 to the left face 76 of plate 73, so that the tube 66, and hence the follower plate 63, is also connected to and supported by flange 35. Thus, one end of the torque tube 63 is anchored, in a manner similar to the anchoring of one end of the tube 29, see Fig. 2.

The follower plate 63 is secured to the left or free end 77 of the torque tube so that any turning force applied to plate 63 will be transmitted directly to tube 66 to induce therein a turning force or torque which is in proportion to the viscosity of the liquid in layer 64. To secure this result, a pair of parallel depending rods 78 extend through registering openings formed in plate 63. In order to position the plate 63 accurately relative to rods 78 and tube 66, the rods 78 are formed with collars or shoulders 79 against which the plate 63 is held in any suitable or well known manner. The upper ends of rods 78 are connected by a plate 82 held in place by nuts 83 which engage the upper threaded ends of the rods 78. Thus, the rods 78 and plates 63 and 82 provide a rigid structure, as is deemed apparent from an inspection of Figs. 3 and 4. The plate 82 is formed with a laterally extending portion 85, the purpose of which will be later described.

As mentioned above, the turning of shaft 42 and drum 55 will transmit a turning force through the liquid layer 64 to the follower plate 63 and tend to turn or rock the latter. This tendency to turn or rock plate 63 is in proportion to the viscosity of the liquid. It is highly desirable that the turning force on plate 63 be transmitted to tube 66 to impart only a turning or torque force and not a bending force in tube 66. Otherwise, the torque induced in tube 66 might not be in proper relation to the turning of plate 63 and hence the voscosity of the the liquid. Therefore, it is imperative that any turning movement of plate 63 results only in a turning or twisting force in tube 66. To this end, it is necessary that plate 63 turn accurately about the axis 67 of the torque tube 66, and also that the left end of the torque tube be supported so as to eliminate any bending of the tube. In the preferred embodiment this result is obtained by providing a bearing for the left end of tube 66, and also by connecting the plate 85 and hence plate 63 to the tube 66 by a device which will insure that the tube 66 will be rotated only, and such rotation will be exactly about the center of tube 66.

Figure 6:
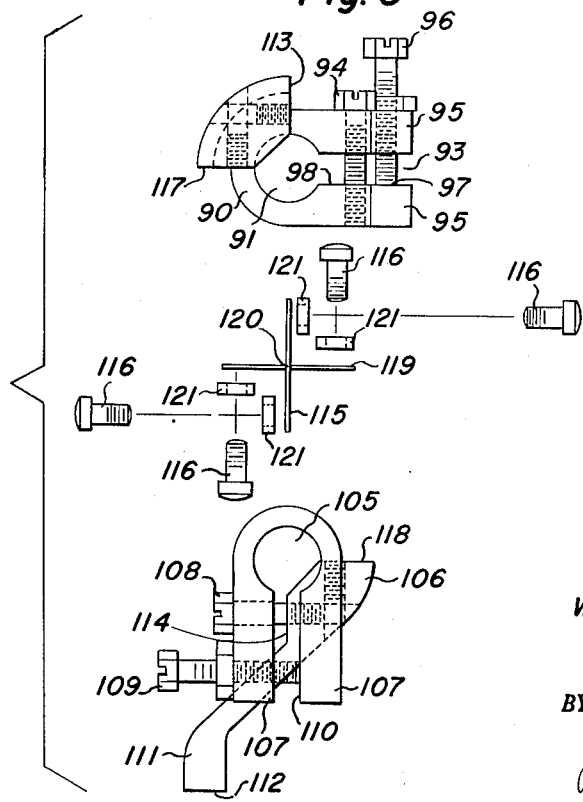
Fig. 6 is an exploded view of the torque tube clamp assembly.

To secure this result, the plate 85 is connected to the tube 66 by a "Taylor instrument torque tube clamp assembly" which is manufactured by the Taylor Instrument Companies of Rochester, New York, and generally indicated by the numeral 89. An exploded view of this tube clamp assembly is illustrated in Fig. 6, but does not, per se, form a part of the present invention. This clamp comprises, in part, a supporting member 90 formed with an opening 91 adapted to receive a stub-shaft 92. The member 90 is split, as shown at 93, to permit insertion of the shaft 92. After the shaft has been positioned in place, screws 94 are screwed in to draw bifurcations 95 down into tight clamping relation with the shaft 92 to hold the latter against movement relative to the member 90. The upper bifurcation 95 carries a jack screw 96 which extends through a registered threaded opening in the upper bifurcation, and is positioned so that the lower end 97 thereof may engage the upper face 98 of the lower bifurcation, as shown in Fig. 6. Now, if it should become necessary to remove the stub-shaft 92, the screws 94 are backed off. However, if it is found that the bifurcations will not spread sufficiently to release the shaft 92, then by screwing in jack screw 96, the end 97 thereof may be moved against the face 98 of the lower bifurcation so as to spread the bifurcations to release the shaft 92, all as is deemed apparent from an inspection of Fig. 6.

The shaft 92 projects to the left of the member 90 as shown in Fig. 3, and is supported in a cross member 99 of a U-shaped bracket which is formed with parallel side members 100 connected to opposite ends of the cross member 99 and extending in parallel relation to and on opposite sides of the torque tube 66 towards the left face 101 of the pipe flange 35, Fig. 3. The free ends of the side members 100 are bent outwardly to form lugs or ears 102 which extends parallel to the cross member 99 and are connected to the left face 101 of the flange 35 by bolts 103, or other suitable fashioning means. The left end 77 of the torque tube 66 has secured thereto, as by a weld 128, a sleeve or bushing 129 which extends into an opening 105 formed in a clamping member or bracket 106 as best shown in Fig. 4. The latter is also formed with bifurcations 107 which may be drawn down tight by means of screws 108 to clamp bracket 106 tight against the sleeve 129 to clamp tube 66 to bracket 106. The bracket 106 is also provided with a jack screw 109 carried by the left bifurcation 107 and adapted to be moved into engagement with the upper surface 110 of the right bifurcation 107 to spread the bifurcations to permit attachment of the bracket 106 to and detachment of the bracket from the sleeve 106 and hence the tube 66. The bracket 106 has formed integral therewith a laterally extending arm 111 of the shape best shown in Figs. 5 and 6. The lower end 112 of the arm 111 is connected in any suitable and well known manner to the lateral portion 85 of the plate 82, thus to connect the follower plate 63 directly and positively to bracket 106 and hence torque tube 66.

The bracket 106 is connected to the supporting member 90 so that the axis 67 of the torque tube 66 is in alignment with the stub shaft 92, and also so that the follower plate 63 will rock accurately about the axis 67 of the torque tube 66. To secure this result, the supporting member 90 and the bracket 106 are formed with aligned flat faces 113—114, respectively, which are arranged in vertical alignment with the tube axis 67. The faces 113 and 114 are connected by a pair of axially spaced springs 115, the ends of which are connected to faces 113 and 114 by means of screws 116. The supporting member 90 and the bracket 106 are also formed with aligned flat faces 117 and 118 which are in horizontal alignment with the tube axis 67. These horizontal faces 117 and 118 are also connected by a pair of axially spaced springs 119 the ends of which are connected to faces 117 and 118 by screws 116. The springs 115 and 119 are in interdigitating relation and are so positioned that the points of crossings 120 of the springs are in exact registry with the axis 67 of the tube 66 and the axis of the stub shaft 92. Thin washers 121 may be placed under the heads of the screws 116.

By means of this arrangement, the follower plate 63 is connected to the torque tube 66 so as to rotate about the exact center of the latter. Also, the left end 77 of the torque tube is connected through springs 115 and 119 to the supporting member 90, which is, in turn, carried by the U-shaped bracket so that the left end of the torque tube is supported to prevent any bending thereof so that any rocking movement of the follower plate is transmitted to the torque tube only as a turning or torque force. In addition, the right end of the torque tube 66 is anchored rigidly to the flange 35 by welding 75, while the left end is supported by the flange 35 through the above-described structure, but is free to twist or turn in response to the movement of the follower plate 63. The result of the above-described structure is that the turning of plate 63 in response to the turning force imparted thereto from the rotation of drum 55 will be transmitted to the torque tube 66 solely as a torque force. Therefore, the torque force induced in tube 66 is in proper proportion to and is a direct measure of the viscosity of the liquid in layer 64, the advantages of which are deemed apparent to those in the art.

The torque force thus induced in the torque tube 66 is an indication of the viscosity of the liquid, and this torque force in tube 66 may be employed to indicate or record such viscosity. For this reason a rod 130 extends freely into the tube 66 and has the inner end 131 welded or otherwise rigidly anchored at 132, to the inner end 77 of the tube 66, as best shown in Fig. 4. This welding serves to seal tube 66 from the liquid in the container into which tube 66 and shaft 42 are immersed. Where the rod 130 is welded at 132 is the sole connection of the rod 130 with the tube 66. This arrangement is substantially the same as that illustrated in Fig. 2, and previously described.

It will now be apparent that when shaft 42 and drum 55 are rotated, a turning force or torque is transmitted through the liquid layer 64 to produce a turning force on the non-rotatable follower plate 63 to tend to turn the latter. This turning force on plate 63 is in proportion to the viscosity of liquid in the layer 64, and this turning force is transmitted to the torque tube 66 to induce a torque in the latter. At the point of welding 132 this torque or turning force in tube 66 is transmitted to rod 130 to impart a turning thereto, such turning being in proportion to the liquid viscosity. Thus, the turning of the rod is a direct indication of the liquid viscosity, and this turning may be utilized to operate certain instruments of well known design to indicate, record or control the viscosity. Such instruments may be connected to the projecting end 133 of rod 130 which is secured to and supported and guided in a bearing 134 carried by plate 73. A bearing cover plate 135 is secured to plate 73 to retain the bearing 134 in place. As the particular instrument or instruments, which may be connected to the projecting end 133 of rod 130 form no part of the present invention, and may be purchased from various manufacturers, details of such instruments are not shown or described. Suffice it to say, that the torque induced in tube 66 is transmitted through rod 130 to indicating or recording instruments. Obviously the outer end 133 of rod 130 may be used in conjunction with a cooperating scale which is suitably calibrated in terms of viscosity so as to indicate the viscosity directly to the operator.

In many places where a true liquid or solution is being measured the periphery 56 of drum 55 may be a true cylinder concentric with shaft 42. However, in certain processing operations solvents and solids are fed into a container and mixed to dissolve the solids to form a solution of the desired consistency or viscosity. In such a case, it may be found that some of the solids may be carried in suspension in the solvent prior to going into complete solution. Then, if the drum 56 is true cylinder, due to the diminishing width between the drum 55 and the follower 63 as the common center line is approached, due to the differences in radii of the drum on the follower plate, there would be a tendency for the contaminated or undissolved solid particles to wedge between the drum 55 and the follower plate 63, the disadvantages of which are apparent. However, by making the drum periphery 56 in the form of a crowned surface, the possibility of such wedging action is reduced, the crowned surface tending to discharge the particles over the end of the drum.

Many other modifications of the viscosity measuring device of the present invention will be apparent to those in the art. For example, the device may be used in pressure vessels, storage tanks, pipe lines or almost any vessel in which it is desirable to measure the viscosity of the liquid therein. Furthermore, in the embodiment of Figs. 1 and 2, while only one rotatable plate is shown, it is apparent that a second rotatable plate may be positioned above the non-rotatable plate so that the latter will be positioned between a pair of rotatable plates. Alternately, in Figs. 1 and 2, a second non-rotatable plate may be positioned below the rotatable plate so that the latter will be positioned between two non-rotatable plates. Also, the number of rotatable and non-rotatable plates may be varied without departing from the spirit or scope of the invention. While the present embodiment shows torque tubes 29 or 66 welded at one end, in cases where the escaping vapors or loss of pressure are not objectionable, the torque tube transmitting the angular movement of non-rotatable plate may emerge through an open hole in the top of the container and the torque tube may be balanced by a suitable spring arrangement, not shown. Also, the device of the present invention may be used to cover any viscosity range desired.

The present invention thus provides a viscosity measuring device which is positioned directly in the liquid to be measured, so as to provide immediate and accurate readings of viscosity. Also, the readings are immediately available to the operator so that the latter may make any necessary changes to maintain the desired or predetermined viscosity, thus preventing the passage through the processing apparatus of a liquid of an undesired viscosity. The measuring device of the present invention is simple in structure, comprises few parts of rugged construction, easy to operate and accurate and highly effective in its results.

While certain embodiments of the invention have been disclosed, it is to be understood that the inventive idea may be carried out in a number of ways. This application, therefore, is not to be limited to the precise details described, but is intended to cover all variations and modifications thereof which fall within the scope of the appended claims.

What I claim and desire to secure by Letters Patent of the United States Patent Office is:

1. A viscosity determining device comprising, in combination, a rotating shaft positionable in a liquid the viscosity of which is to be determined, a shear member positionable in said liquid and mounted on and rotatable with said shaft, a torsion element extending into said liquid substantially parallel to but offset laterally from the axis of said shaft, a support, means for anchoring one end of said element to said support, a second shear member connected to the other end of said element and positionable adjacent but slightly spaced from said first member, the rotation of said first member transmitting a turning force through said liquid to said second member and tending to rotate the latter and said element, said force being in proportion to said viscosity, and means connected to said element and extending to a point beyond said support to indicate the amount of said force.

2. A viscosity determining device comprising, in combination, a rotatable shaft positionable in a liquid the viscosity of which is to be determined, a shear member positionable in said liquid and mounted on and rotatable with said shaft, a torsion element extending into said liquid substantially parallel to but offset laterally from the axis of said shaft, a support, means for anchoring one end of said element to said support, a second shear member connected to said element adjacent the other end thereof, said second member overlying only a portion of the area of said first member and spaced therefrom by a layer of said liquid so that rotation of said first member will impart a turning force to said second member through said layer, said force being in proportion to the viscosity of said liquid, and means connected to the other end of said element and extending to a point beyond said support to indicate the amount of said force.

3. A viscosity determining device comprising, in combination, a rotatable shaft positionable in a liquid the viscosity of which is to be determined, a shear member mounted on and rotatable with said shaft, a hollow torsion element extending into said liquid and spaced laterally to one side of said shaft, a support, means for anchoring one end of said element to said support, a second shear member secured to said element adjacent the other end thereof, said second member being positioned adjacent but slightly spaced both axially and radially from said first member and spaced therefrom by a layer of said liquid, said second member overlying a portion only of the area of said first member so that rotation of said first member will transmit a turning force to said second member through said layer and tend to turn said second member and said element, said force being in proportion to the voscosity of said liquid, means projecting into said element and connected thereto and extending to a point outside said element, and means for connecting said last-mentioned means to said element adjacent said second member so that said force will turn said projecting means an amount in proportion to said density.

4. A viscosity determining device comprising, in combination, a rotatable shaft positionable in a liquid the viscosity of which is to be determined, a flat shear plate positionable in said liquid and connected to said shaft and extending radially therefrom, a second flat shear plate positionable in said liquid and arranged parallel to said first plate, a marginal area of one face of said second plate overlying a constant marginal area of a face of said first plate and spaced therefrom by layer of said liquid, a hollow torsion element positionable in said liquid in parallel relation to said shaft, a support, means for anchoring one end of said element to said support, means for anchoring said second plate to the other end of said element, the rotation of said shaft and first plate serving to transmit a turning force through said layer to said second plate and said element, said transmitted force being in proportion to the viscosity of said liquid, and means extending into said element and connected to the latter at said other end to transmit said force to a point outside said element.

5. In a viscosity determining device, the combination with a vessel containing a liquid the viscosity of which is to be determined, a rotating shaft positioned in said vessel, a radially extending shear plate mounted on and rotatable with said shaft, said vessel having an aperture formed in one end thereof offset laterally from the axis of said shaft, a tubular torsion element extending through said aperture and into said vessel substantially parallel to said shaft, means for anchoring the upper end of said element to said vessel, means within said vessel adapted to receive and guide the lower end of said element, a restrained second shear plate arranged parallel to and overlying a constant area of said first plate and spaced therefrom by a layer of the liquid the viscosity of which is to be measured, means to connect said second plate in non-rotatable relation to said element adjacent said lower end, the rotation of said first plate serving to impart a turning force to said second plate and element through said layer to cause a twisting of the lower end of said element, a rod extending from a point outside said vessel and into said element and terminating adjacent said lower end, and means for anchoring said rod to said lower end so that the twisting of said element will be transmitted through said rod to a point outside said vessel to indicate the amount of said force to show the viscosity of said liquid.

6. A viscosity determining device comprising, in combination, a support, a rotatable shaft carried by said support and positionable in a liquid the viscosity of which is to be determined, a shear member carried by and rotatable with said shaft, an arcuate surface on said member substantially concentric with said shaft, a second shear member positioned radially from said first shear member and spaced therefrom by a layer of said liquid, an arcuate surface on said second member having the same direction of curvature as, but extending only part way around, the arcuate surface of said first member, a torque element connected to said support, means for connecting said second shear member to said element so that any turning force applied to said second shear member will be transmitted to said element, means to rotate said first member to impart a turning force through said layer to said second member, said force being in proportion to the viscosity of the liquid, and means connected to said element to indicate said viscosity.

7. A viscosity determining device comprising, in combination, a support, a rotatable shaft carried by said support and positionable in a liquid the viscosity of which is to be determined, a shear member carried by and rotatable with said shaft, an arcuate surface on said member substantially concentric with said shaft, a second shear member positioned radially from said first shear member and spaced therefrom by a layer of said liquid, an arcuate surface on said second member having the same direction of curvature as, but extending only part way round, the arcuate surface of said first member, the radius of curvature of said second arcuate surface being greater than that of said first surface, a hollow torque element, means to anchor one end of said element on said support, means to connect said second shear member rigidly to said element at a point on the latter spaced from said anchorage so that any turning force applied to said second shear member will develope a torque in said element, means to rotate said shaft and first shear member to transmit a turning force from said first member through said layer to said second member to induce a torque in said element, a transmitting member extending into said element and connected to the latter adjacent the point of connection of said second member to said element so that any torque induce into said element will be transmitted to said transmitting member to turn the latter, said turning being in proporion to the viscosity of said liquid, and an indicating portion of said transmitting member projecting from said element.

8. A viscosity determining device comprising, in combination, a support, a rotatable shaft carried by said support and positionable in a liquid the viscosity of which is to be measured, a shear drum carried by said shaft and having a cylindrical surface susbtantially concentric with said shaft, a torque element connected at one end to said support and positioned at one side of and extending substantially parallel to said shaft, a shear member positioned laterally from the surface of said drum and spaced therefrom by a layer of said liquid, said shear member having an arcuate surface which has the same direction of curvature as, but of different radius than, said drum surface and extends only part way around said drum surface, means to connect said shear member to said torque element so that any turning force applied to said shear member will induce a torque only in said element, means to rotate said shaft and drum so as to transmit a turning force from said drum surface through said liquid portion to said shear member to induce a torque in said element, said torque being in proportion to said viscosity, and means connected to said element and movable in response to said torque to indicate the viscosity of said liquid.

9. A viscosity determining device comprising, in combination, a support, a rotatable shaft carried by said support and positionable in a liquid the viscosity of which is to be measured, a shear drum carried by said shaft and having a cylindrical surface substantially concentric with said shaft, a torque element connected at one end to said support and positioned at one side of and extending substantially parallel to said shaft, a shear member positioned laterally from the surface of said drum and spaced therefrom by a layer of said liquid, said shear member having an arcuate surface which has the same direction of curvature as said drum but extends only part way around said drum surface, said second surface having its center of curvature on the axis of said element so that said surfaces curve in the same direction but have different radii of curvature, means to connect said shear member rigidly to said element adjacent the other end of the latter so that any turning force impressed on said second member will induce a torque only in said element, means to rotate said shaft and drum as a unit to set up a turning force in said liquid portion so that the latter will transmit the turning force to said shear member to induce a torque in said element, said troque being in proportion to the viscosity of said liquid, and means connected to said element and movable in response to said torque to indicate the viscosity of said liquid.

10. A viscosity determining device comprising, in combination, a support, a rotatable shaft carried by said support and positionable in a liquid the viscosity of which is to be measured, a shear drum carried by said shaft and having a crowned cylindrical surface which is substantially concentric with the axis of said shaft, a torque tube positioned at one side of and substantially parallel to said shaft, means for anchoring one end of said tube to said support, a shear member positioned radially of said drum on the side of the shaft opposite said tube, means to connect said member to the end of said tube remote from said support, said shear member having an arcuate surface which has the same direction of curvature as said drum surface but overlies only a portion of the latter, the radius of curvature of said second surface being on the axis of said tube so that the radius of curvature of said second surface is greater than that of said first surface, the connection of said shear member to said tube being such that any turning force applied to said shear member will induce a torque in said tube, means to rotate said shaft and said drum so that the latter will set up a turning force in said liquid layer which will, in turn, transmit said force to said shear member to induce a torque in said tube, a rod extending freely into said tube, means to connect one end of said rod to said tube adjacent the point of connection of said shear member so that any torque induced in said tube will turn said rod, said turning being in proportion to the viscosity of said liqud, and an indicating portion of said rod projecting from said tube.

References Cited in the file of this patent

UNITED STATES PATENTS

| | | |
|---|---|---|
| 1,836,995 | Stickney | Dec. 15, 1931 |
| 2,203,132 | Delamere et al. | June 4, 1940 |
| 2,360,546 | Cardwell, Jr. | Oct. 17, 1944 |
| 2,457,247 | Lawshe | Dec. 28, 1948 |
| 2,519,378 | Kilpatrick | Aug. 22, 1950 |
| 2,599,159 | Breedlove | June 3, 1952 |

FOREIGN PATENTS

| | | |
|---|---|---|
| 847,076 | Germany | Aug. 21, 1952 |